(12) United States Patent
Rosendahl et al.

(10) Patent No.: US 6,715,459 B2
(45) Date of Patent: Apr. 6, 2004

(54) OIL PAN HAVING AN INTEGRATED OIL FILTER UNIT

(75) Inventors: Marco Rosendahl, Wiehl (DE); Markus Beer, Morsbach (DE)

(73) Assignee: IBS Filtran Kunststoff/Mettallerzeugnisse GmbH (DE)

( * ) Notice: Subject to any disclaimer, the term of this patent is extended or adjusted under 35 U.S.C. 154(b) by 8 days.

(21) Appl. No.: 10/265,595

(22) Filed: Oct. 8, 2002

(65) Prior Publication Data

US 2003/0140887 A1 Jul. 31, 2003

(51) Int. Cl.⁷ .............................. F02F 7/00; B01D 35/02
(52) U.S. Cl. .............................. 123/195 C; 29/525.06; 123/196 A; 184/6.24; 184/106; 210/168
(58) Field of Search ........................ 123/195 C, 196 A; 184/106, 6.24; 29/525.06; 210/168

(56) References Cited

U.S. PATENT DOCUMENTS 4,790,938 A  12/1988  Younger ................ 210/497.01
5,863,424 A * 1/1999  Lee ........................ 210/168
6,143,169 A  11/2000  Lee ........................ 210/168
6,187,185 B1  2/2001  Lee ........................ 210/168

FOREIGN PATENT DOCUMENTS

| DE | 2327625 | 2/1999 |
| DE | 10008692 | 9/2001 |
| EP | 1060779 | 12/2000 |

\* cited by examiner

*Primary Examiner*—Andrew M. Dolinar
*Assistant Examiner*—Katrina B. Harris
(74) *Attorney, Agent, or Firm*—Baker & Hostetler LLP

(57) ABSTRACT

An apparatus and method for filtering oil. The apparatus being an oil pan having an integrated oil filter unit, wherein part of the oil pan forms the bottom of the oil filter unit. The oil filter unit is fastened on the oil pan at least by means of a sealing component and one or more punch rivets. A method of fastening an oil filter unit on an oil pan, the method including introducing a seal and an adhesive between the oil filter means and the oil pan and joining the oil pan and the filter means, including the layer there between, by means of punch rivets.

18 Claims, 4 Drawing Sheets

OIL PAN HAVING AN INTEGRATED OIL FILTER UNIT

PRIORITY

This application claims priority to European Patent Application 02 002 214.1 of Jan. 30, 2002, the disclosure of which is hereby incorporated by reference.

FIELD OF THE INVENTION

The present invention is directed to an oil pan for engines or transmissions with an integrated oil filter unit, wherein part of the oil pan forms the bottom of the oil filter unit.

BACKGROUND OF THE INVENTION

In general, oil filters are employed in engines and transmissions to purify the oil used to lubricate the engine or transmission. Traditionally, oil filtration in an engine or transmission has been accomplished using filters arranged separately outside and inside the oil pan. In general, the filter medium required for filtration is arranged in the filter housing in various ways. The space available in an engine/transmission compartment is highly limited and as a result, the tendency recently has been to avoid bulky constructions in new developments of engines and transmissions and to optimize space economy by integration.

As a result, oil filters are now being used which are integrated in the oil pan of engines or transmissions. This allows rational utilization of the space available in the oil pan, because the latter is intended to receive oil not being used in the engine or transmission circulation. Such arrangements of oil filter inserts in an oil pan have been described in DE A1 197 35 444.0, for example.

For trouble-free function of the oil filter in the oil pan, it is preferable that a tight seal between the filter unit and oil pan is maintained over ranges of high temperature and stress. One should keep in mind that the temperatures in the motor vehicle may range between −40 and +160° C., depending on the user's geographic location and temperature of the oil. As a result of such massive stress caused by temperature, the filter unit frequently undergoes deformation after being used for some time. Regardless of tightness, this may give rise to problems with the functionality of the filter unit, especially with respect to a possibly impaired joint between the oil filter and engine or transmission.

In particular, the use of different materials for the oil pan and the filter insert, e.g. metal for oil pans and plastic for filter inserts, frequently gives rise to problems during assembly as a result of the dissimilar physical properties of these materials, particularly problems with respect to tightness. Due to the long cure times of the adhesive, bonding of the two half-shells of the oil pan required to date delays delivery of the complete oil filter system as would be preferred by the customer.

In particular, efforts are now being made to reduce the overall height of the oil filter units so as to allow an oil filter intake position as low as possible. However, this implies significantly increased constructional requirements.

SUMMARY OF THE INVENTION

The technical object of the present invention was therefore to provide an oil pan for engines or transmissions having the oil filter unit integrated therein, which oil pan avoids some or all of the above-mentioned drawbacks, preferably enabling long-term and trouble-free oil filtration, and sufficient and permanent tightness even under major temperature fluctuations.

One embodiment of the present invention includes an oil pan having an integrated oil filter unit, wherein part of the oil pan forms the bottom of the oil filter unit in such a way that the oil filter unit is fastened on the oil pan. The oil filter unit is fastened to the oil pan at least by means of a sealing component and one or more punch rivets. In some embodiments of the present invention, the sealing component can be an adhesive component. In some embodiments of the present invention, the sealing component is a sealing element situated between the oil filter unit and oil pan.

The construction can be of such a design that either a sealing element merely is inserted or contact-extruded, followed by riveting, or, an adhesive compound is applied instead of the sealing element, assuming the function of the seal and simultaneously joining the components.

Both the oil pan and filter unit can be made of any conceivable material suitable for punch riveting. These materials include metallic or non-metallic materials or composite materials, such as metals, alloys, steels, or plastics which, in addition, can be coated with inorganic or organic substances. In a preferred embodiment, an oil pan made of metal, particularly sheet metal, diecast aluminum, or steel, and a filter unit made of plastic are used.

The actual filter unit comprises one or more filter media, such as segment screens, paper filters, as well as polyester filter felts which, depending on the material, can be disc-shaped or bag-shaped or folded, and a frame bordering the filter medium, as well as a cover advantageously attached to the frame, which cover can be welded, for example. In a preferred fashion, the frame of the filter unit is formed by extruding around the filter medium.

In a preferred embodiment, the filter unit has a fastening area useful in fastening the filter unit to the oil pan. Said fastening area represents part of the filter unit frame, is of a design so as to extend—at least partially—parallel to the oil pan bottom, not unlike a foot, and advantageously has a groove on its underside which makes contact with the oil pan. The thus-designed frame of the filter unit allows fastening of the filter unit to the bottom of the oil pan by introducing an adhesive component in the groove described above. In addition, the fastening area extending parallel to the bottom of the oil pan should be of a thickness so as to allow fitting of the oil pan with the aid of punch rivets.

Fastening of the filter unit within the oil pan is facilitated when the oil pan in the fastening area likewise has a groove which, preferably, is somewhat wider than the fastening area of the frame of the filter unit extending parallel to the bottom of the oil pan. This enables mating the fixture of the filter unit on the bottom of the oil pan and prevents deformation of the filter unit after fixture as a result of drastic conditions of use.

A permanent and tight joint between frame and oil pan should preferably be provided to promote trouble-free oil filtration. To this end, a sealing element is preferably introduced in the groove situated in the fastening area of the frame of the filter unit. Use of a sealing element simultaneously having adhesive properties is of particular advantage. Conventional materials, such as acrylate rubber (ACM), ethylene acrylate elastomer (AEM), or fluororubber (FPM), can be used as sealing element, while two-component or silicone adhesives represent examples of an adhesive sealing material.

Primarily due to the massive temperature fluctuations, fixture of the filter unit on the oil pan merely using a seal and adhesive, as has been the case up to now, has resulted in leakages after some time and in deformation of sealant or adhesive; therefore, in the oil pan according to the present invention, fixture of the frame on the oil pan is effected by means of joining using punch rivets, particularly semi-tubular rivets.

Joining two or more joining parts using semi-tubular rivets has been known for some years and is already being used in other applications. In the automotive industry, for example, the aluminum body-in-white of motor vehicles is manufactured using punch riveting. As has been described in DE 44 31 769 and DE 197 01 150, for example, punch riveting using semi-tubular rivets is based on the use of plastically deformable auxiliary joining parts and is characterized by indirect non-removable joining of two or more joining parts, especially sheet metal parts, without any prepunch operation, using an auxiliary joining part simultaneously functioning as a clipping punch. The punch rivet designed as a semi-tubular rivet, with a countersink bore designed as a cutting edge, punches through the upper n-1 of n joining parts to undergo plastic deformation in the lowermost joining part by widening. The strength of the riveted joint particularly depends on the undercut, $S_H$, achieved during widening.

An advantage of some embodiments of the present invention is that no preparatory works such as punching the joining parts are necessary and deformation is minimized—preferably, no deformation occurs—as contrasted by thermal processes. Additionally, the lowermost joining part, not being punched through itself, represents a non-damaged protective layer and thus, a largely tight joint. Moreover, operation and maintenance costs for the punch rivet process are rated low.

Another benefit of this method can be seen in the potential of joining materials in an easy and liquid-tight fashion that are completely different in their physical and surface properties. A device for performing the punch-riveting process has been described in the laid-open document DE 199 05 527, for example.

In a preferred fashion, punch riveting in the present oil pan according to the invention is used in the critical areas only, particularly in the corners, but is not limited with respect to the number of punch rivets used. The inventive combination of sealing element/adhesive and punch rivets achieves a permanent and tight joint between frame and oil pan with lowest possible input and without the risk of filter unit deformation during use.

In particular, by using a sealing adhesive, a significant reduction in the number of rivets is possible, with tightness being ensured at the same time. In this case, the rivets merely represent a fixture of the components during the drying phase of the adhesive and therefore, complete drying and curing of the adhesive prior to delivering to the customer is no longer required. The oil pan therefore can be delivered to the customer directly after joining.

The present invention not only enables system delivery within short terms but also purposeful utilization of the space occupied during drying, which to date has been used in the premises of the production site due to necessary drying prior to delivery.

Essentially, the material of the semi-tubular rivets to be used is determined by the hardness of the parts to be joined. It is preferred to use rivets made of stainless steel.

The present invention is also directed to a method of fastening an oil filter unit on an oil pan, said method comprising the following steps: introducing a seal and an adhesive between the oil filter means and the oil pan; and joining the oil pan and the filter means, including the layer there between, by means of punch rivets.

In a preferred embodiment, the seal is introduced by inserting between the oil filter unit and the oil pan the seal itself or the oil filter unit and/or oil pan additionally being provided with an adhesive. Conventional substances such as one or two component silicone or polyurethane adhesives are used as adhesives. Common materials, such as those made of acrylate rubber (ACM), ethylene acrylate elastomers (AEM), or fluororubber (FPM) may find use as seals.

In another preferred embodiment, the seal initially is fixed on the filter unit and placed together with the latter on the oil pan. In a particularly preferred fashion, the seal is fixed by extrusion on the filter unit. Advantageously, materials such as those made of acrylate rubber (ACM), ethylene acrylate elastomers (AEM), or fluororubber (FPM) are used.

In a third preferred embodiment, the seal is introduced by injecting the sealing element between filter unit and oil pan. To this end, it is advantageous to use sealing adhesives, such as silicone adhesives or two-component adhesives. It is convenient to inject into the groove situated on the fastening area of the fume extending parallel to the oil pan. The oil pan of the invention will be described in detail with reference to the following figures which, however, are not intended to be limiting to the invention.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
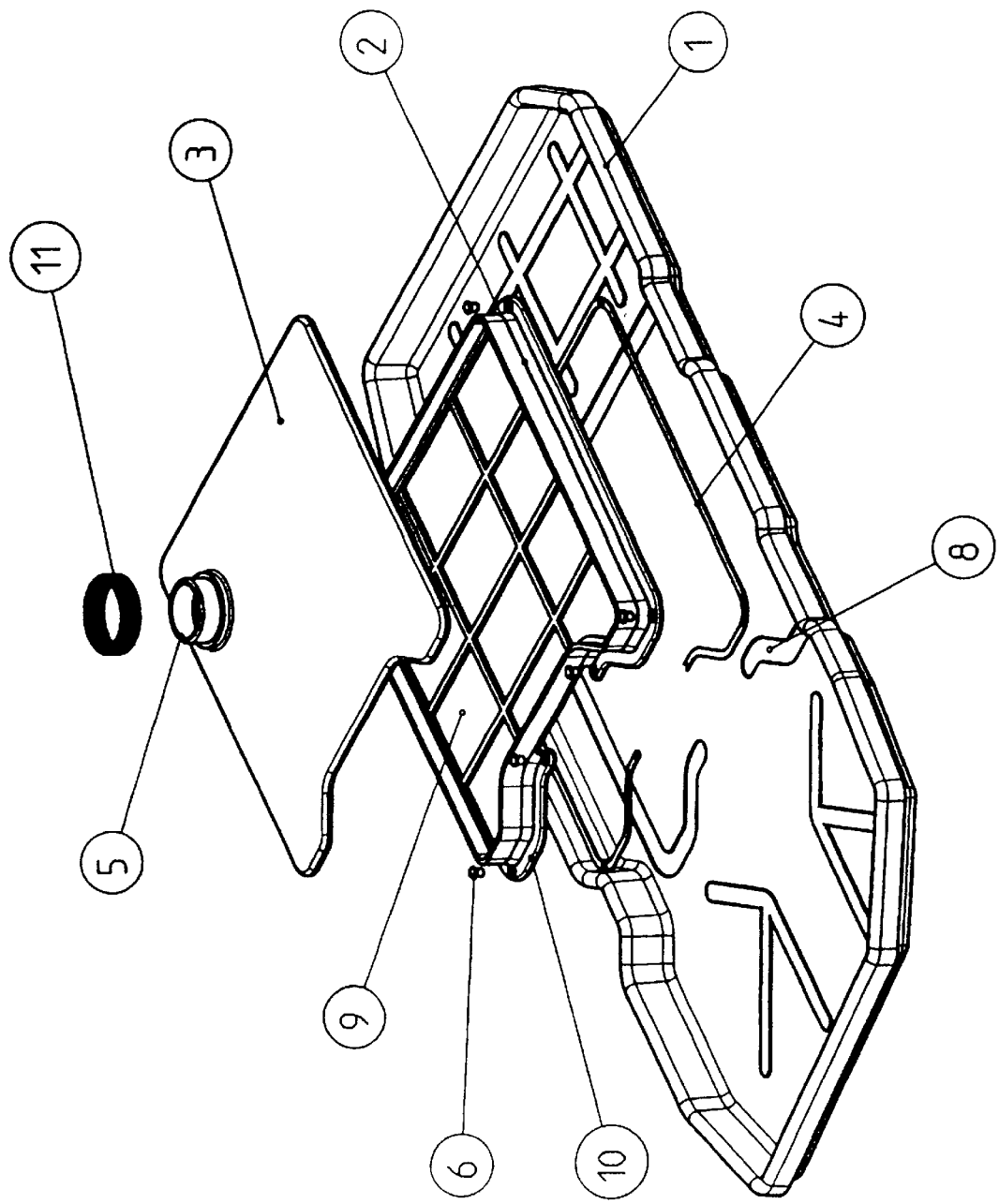
FIG. 1 provides an oblique top view of an embodiment of the present invention.

FIG. 1 shows the schematic arrangement of a preferred embodiment of the oil pan according to the invention in oblique top view. 1 represents the actual oil pan, simultaneously forming the bottom of the oil filter unit. The filter unit is comprised of frame 2 of the filter unit, which also has a fastening area 10 extending at least partially parallel to the bottom of the oil pan, filter medium 9 and cover 3 of the filter unit. Frame 2 of the filter unit is formed by extruding around the filter medium 9. Conveniently, the cover 3 of the filter unit is welded on the frame 2 component during the production process.

The oil pan 1 preferably has a groove 8 corresponding in shape to the filter unit. Advantageously, the seal 4 which is situated between oil pan 1 and frame 2 of the filter unit is introduced in said groove 8. The adhesive component intended to fix frame 2 of the filter unit on the oil pan is omitted in this illustration. Punch rivets are used for additional fixture of the filter unit.

In regular operation, the oil passes from the engine or transmission circulation into the oil pan 1, flows through the inlet opening 7 into the interior of the filter unit beneath the filter medium 9, is drawn through filter medium 9 by means of a suction pump, and eventually passes back into the circulation via outlets opening 5. The outlet opening 5 is provided with a seal ring 11.

Figure 2:
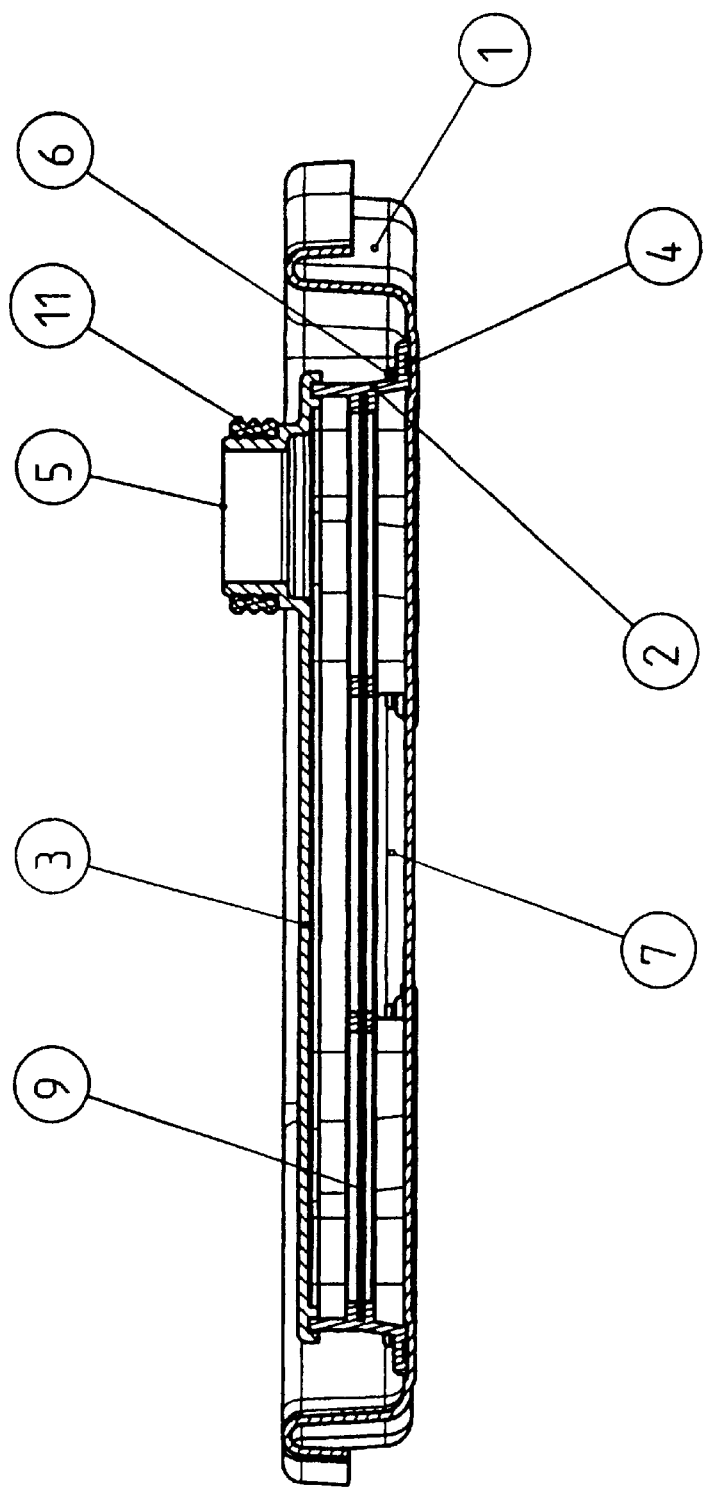
FIG. 2 provides a longitudinal cross-section of the embodiment of FIG. 1.

FIG. 2 illustrates a longitudinal section of the preferred embodiment of the oil pan according to the invention.

Figure 3:
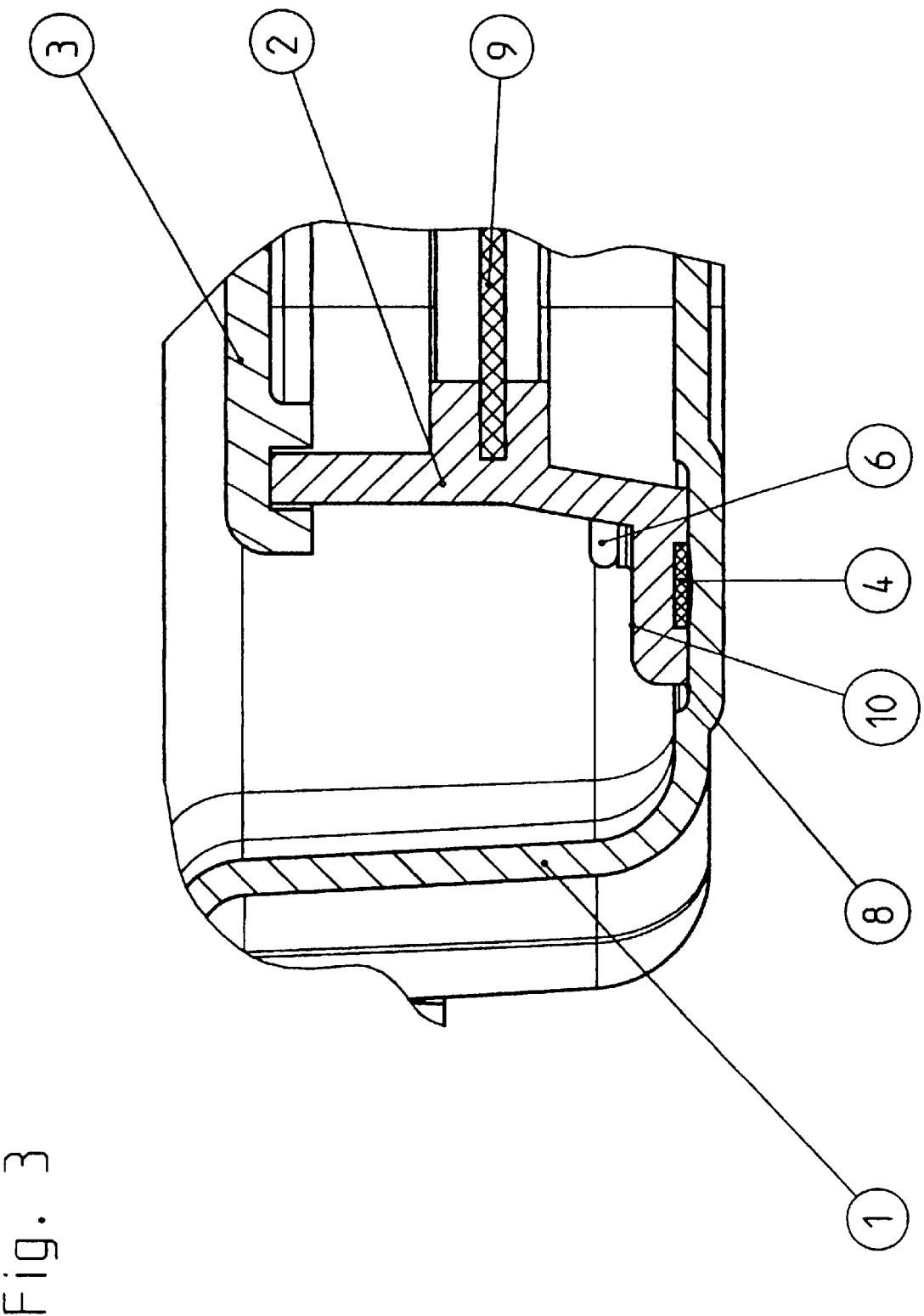
FIG. 3 provides an enlarged cross-section view of the fastening area of FIG. 2.

FIG. 3 shows an enlarged view taken from FIG. 2, which is a longitudinal section through fastening area 10 extending largely parallel to the oil pan 1. As elaborated therein, the oil pan 1 as well as the fastening area 10 of the filter unit have a groove 8, the shape of groove 8 of oil pan 1 being designed so as to enclose the fastening area 10 of the filter unit.

Figure 4:
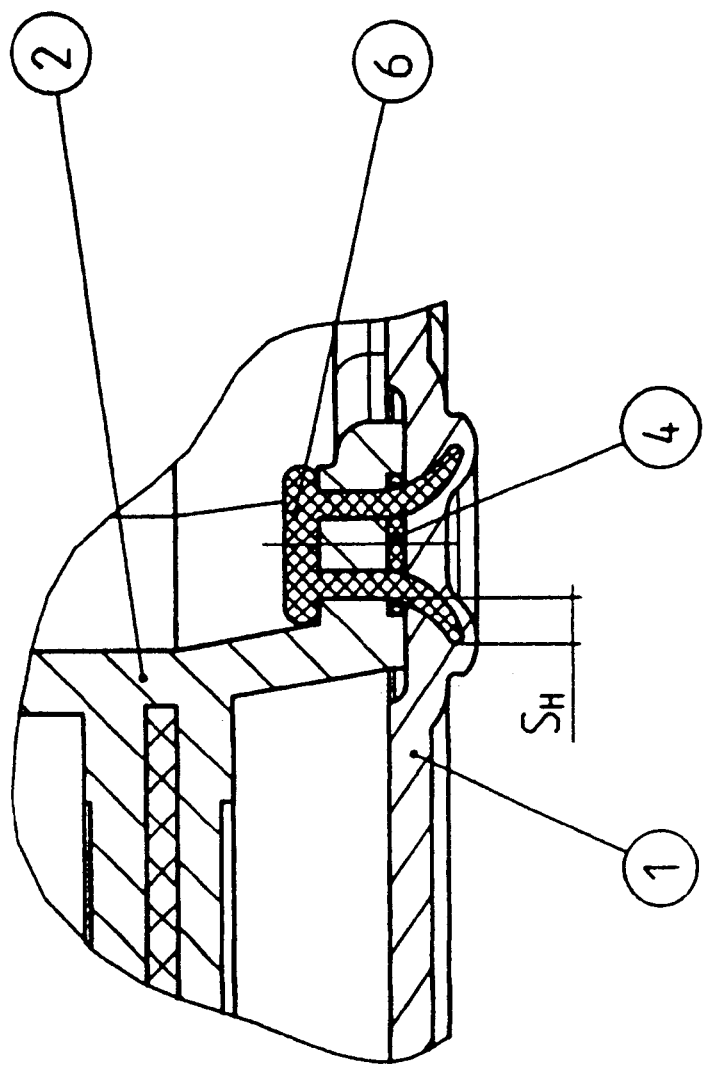
FIG. 4 also provides a cross-sectional view of the fastening area of FIG. 2, including the punch rivets.

FIG. 4 corresponds to the section of FIG. 3, but unlike therein, the latter extends through punch rivet 6. FIG. 4 sketches the joining site subsequent to joining. The undercut formed during widening of the semi-tubular rivet in the course of the punch process is designated SH. Said undercut has an influence on the strength and tightness of the joint. As elaborated in FIG. 4, said joining comprises the oil pan 1, the fastening area 10 of the filter unit, as well as the seal 4.

A preferred embodiment of the present inventive apparatus and method is illustrated in FIG. 1.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

Reference List

1 Oil pan
2 Frame of filter unit
3 Cover of filter unit
4 Seal or adhesive
5 Outlet opening
6 Rivet joint
7 Inlet opening
8 Groove
9 Filter medium
10 Fastening area of the filter unit frame
11 Seal ring

What is claimed is:

1. An integrated oil pan filter unit, comprising:
    a oil pan; and
    a filter unit, wherein the filter unit is fastened to the oil pan by at least a sealing component and one or more punch rivets.
2. The integrated oil pan filter unit of claim 1, wherein said sealing component is an adhesive component.
3. The integrated oil pan filter unit of claim 1, wherein said sealing component is a sealing element.
4. The integrated oil pan filter unit of claim 3, wherein said sealing element has adhesive properties.
5. The integrated oil pan filter unit of claim 3, further comprising an adhesive component.
6. The integrated oil pan filter unit of claim 1, said filter unit comprising a frame and a filter medium.
7. The integrated oil pan filter unit of claim 6, said frame comprising plastic.
8. The integrated oil pan filter unit of claim 7, wherein said filter unit frame comprises a fastening area for fastening the filter unit to the oil pan.
9. The integrated oil pan filter unit of claim 8, wherein said filter unit frame fastening area comprises a groove.
10. The integrated oil pan filter unit of claim 8, wherein said oil pan comprises a groove.
11. The integrated oil pan filter unit of claim 10, wherein said groove corresponds in shape to the filter unit.
12. The integrated oil pan filter unit of claim 10, wherein the sealing component is located in said oil pan groove.
13. The integrated oil pan filter unit of claim 1, wherein the punch rivets are semi-tubular rivets.
14. The integrated oil pan filter unit of claim 1, wherein said oil pan has at least one metal component.
15. A method for making an oil pan having an integrated oil filter, comprising:
    fastening an filter unit to an oil pan using one or more punch rivets and a sealing component.
16. The method of claim 15, wherein said sealing component is inserted between the filter unit and the oil pan.
17. The method of claim 15, wherein said sealing component is fixed by extruding onto the filter unit.
18. The method of claim 15, wherein said sealing component is injected between said filter unit and said oil pan.

* * * * *